United States Patent [19]
Davis

[11] 4,106,784
[45] Aug. 15, 1978

[54] FINISHER'S MANDREL

[76] Inventor: Michael W. Davis, 2775 Mesa Verde E., Costa Mesa, Calif. 92726

[21] Appl. No.: 713,684

[22] Filed: Aug. 12, 1976

[51] Int. Cl.² ............................................ B23B 31/40
[52] U.S. Cl. ...................................... 279/2 R; 82/44; 269/48.1
[58] Field of Search ................. 242/68.2, 72 R, 72 B, 242/130, 13; 82/44; 279/2 R; 408/106; 269/48.1

[56] References Cited

U.S. PATENT DOCUMENTS

| | | | |
|---|---|---|---|
| 389,480 | 9/1888 | Massett | 82/44 |
| 1,323,855 | 12/1919 | Goordman | 82/44 |
| 2,601,419 | 6/1952 | Spahn | 279/2 |
| 2,704,848 | 3/1955 | Straty | 408/106 |
| 2,707,107 | 4/1955 | Tucker | 279/2 |
| 2,850,287 | 9/1958 | Jackson | 279/2 |
| 2,929,635 | 3/1960 | Czerenda | 279/2 |
| 2,935,329 | 5/1960 | Hessler | 279/2 X |
| 2,970,842 | 2/1961 | Drew | 279/2 |
| 3,165,279 | 1/1965 | Remington | 279/2 X |
| 3,517,939 | 6/1970 | Jaehn | 279/2 |
| 3,776,562 | 12/1973 | Gross et al. | 279/2 |

FOREIGN PATENT DOCUMENTS 302,986  1/1955  Switzerland .................. 279/2

*Primary Examiner*—Othell M. Simpson
*Assistant Examiner*—W. D. Bray
*Attorney, Agent, or Firm*—Gordon L. Peterson

[57] ABSTRACT

A mandrel for holding a generally tubular workpiece comprising a body section and a tubular member coupled to the body section. The tubular member is resiliently deformable in a radial direction. An expander is provided within the tubular member to resiliently deform the tubular member radially outwardly. A mounting sleeve having an axial slot therein is provided on the tubular member and is radially expandable by the tubular member. A finger ring or other tubular workpiece can be slipped over the mounting sleeve and firmly clamped in position by the radial expansion of the mounting sleeve.

13 Claims, 4 Drawing Figures

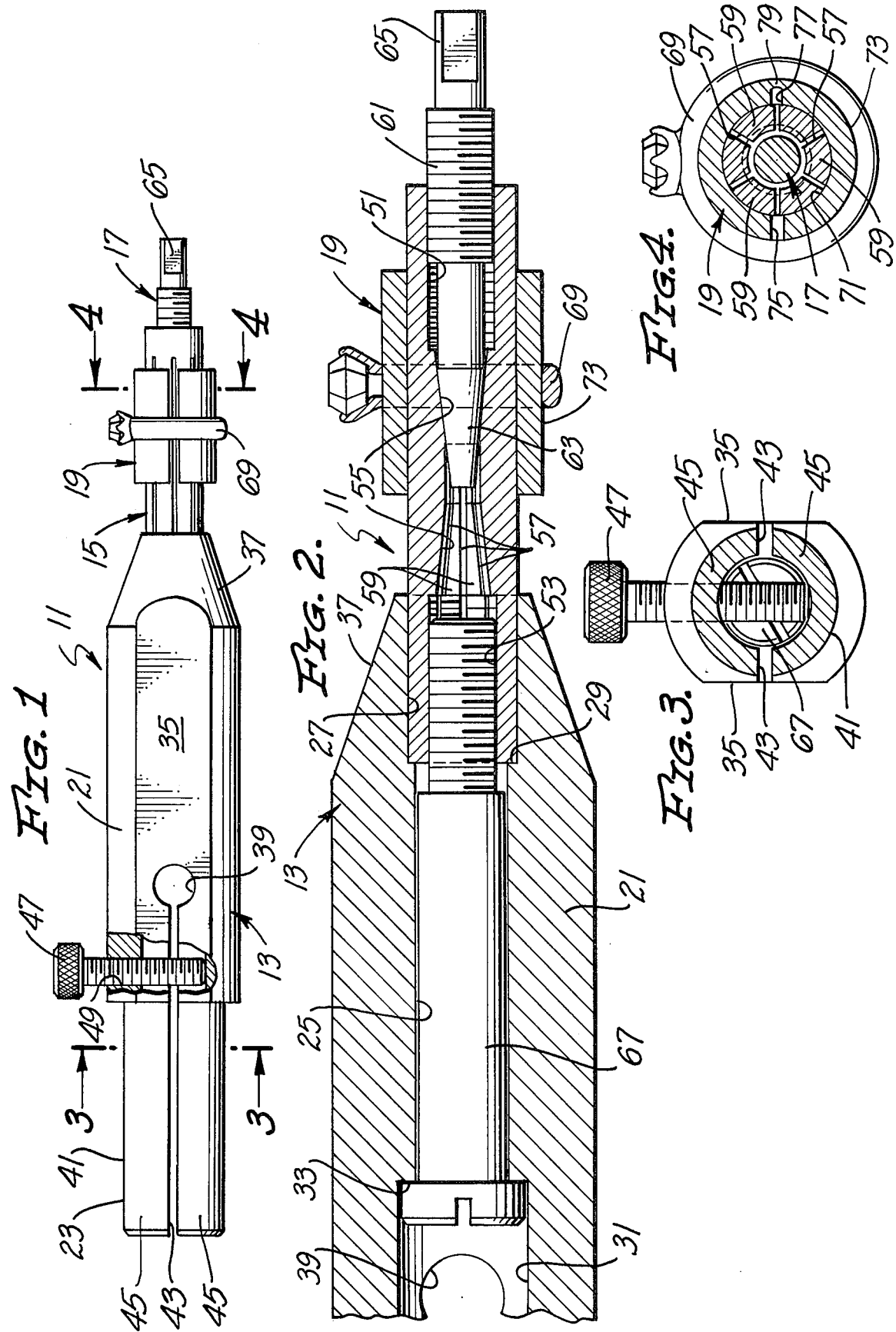

FINISHER'S MANDREL

BACKGROUND OF THE INVENTION

In performing work operations on a tubular workpiece, it is often necessary to firmly hold or clamp the workpiece in position. For example, when a jeweler works on a finger ring, it is necessary to firmly mount the ring in position. Firm mounting of the ring is essential because of the very precise nature of the jeweler's tasks. This ostensibly simple task is actually very difficult because finger rings are typically delicate and made of soft metals. For these reasons, it is very difficult to firmly clamp such a finger ring without deforming or disfiguring it.

There are a number of different prior art devices for mounting finger rings. One such device includes a tapered mandrel on which the ring is mounted. However, the tapered mandrel does not hold the ring steady while the jeweler is working on the ring.

U.S. Pat. No. 2,707,107 issued to Tucker and U.S. Pat. No. 3,866,494 issued to Dotson show devices for holding rings which comprise multiple fingers movable radially outwardly to grip the internal surface of the ring. These fingers engage a relatively small area of the ring, and consequently, the unit loading; i.e., stress, on the portions of the ring so engaged must be relatively high if the ring is to be firmly held in position. This high unit loading tends to deform and/or disfigure the ring. The deformation may result in increasing the inner diameter of the ring so that it is necessary to size the ring.

The patented literature also discloses devices which are adapted to clamp other kinds of tubular articles. For example, Jackson U.S. Pat. No. 2,850,287, Czerenda U.S. Pat. No. 2,929,635 and Gross, et al U.S. Pat. No. 3,776,562 are in this group. The latter two patents of this group are directed to apparatuses which include an expandable collet for holding a tubular workpiece. The workpiece is slipped on the expandable collet, and the collet is expanded to clamp the workpiece. The range over which a collet can be radially expanded is limited and so a wide range of collets must be provided in order to accommodate rings or other workpieces of different internal diameters. Changing collets is a relatively time consuming task. In addition, it is relatively expensive to provide the necessary number of collets.

SUMMARY OF THE INVENTION

The present invention provides a mandrel which firmly mounts a workpiece, such as a finger ring, without damaging or distorting the workpiece. Furthermore, a wide range of shapes and sizes can be simply mounted on the mandrel.

This invention employs a tubular member which is resiliently deformable in a radial direction and radially expandable means adapted to substantially circumscribe the tubular member. The radially expandable means has a peripheral surface on which the workpiece can be positioned. Accordingly, the tubular member can be deformed radially outwardly to radially expand the expandable means to thereby clamp the workpiece on the radially expandable means.

The expandable means may take many different forms; however, it is preferably in the form of a radially expandable mounting sleeve which can be slid over the tubular member. The tubular member may be of any construction which is suitable for resiliently deforming the mounting sleeve radially outwardly. For example, the tubular member may take the form of a collet.

The use of a mounting sleeve between the collet and the finger ring is much better than clamping the finger ring directly on the collet. For example, different mounting sleeves can be provided for different ring sizes by simply slipping the new mounting sleeve onto the collet. This is much easier to do than changing collets inasmuch as a collet must be firmly mounted on the remainder of the mandrel by screws or other fasteners. Mounting sleeves are also much less expensive than collets. In addition, the mounting sleeve can be constructed of relatively soft material, such as aluminum or an aluminum alloy, to protect the ring whereas relatively soft materials may not be suitable for use in the collet particularly if a large expansion range is required.

The mounting sleeve can be of various different constructions. However, resilient radial expansion thereof can be facilitated by providing a slot in the mounting sleeve. To further facilitate radial expansion of the mounting sleeve, it may be provided with a region of reduced thickness. The region of reduced thickness may be the same for mounting sleeves having different wall thicknesses so that the amount of radial expansion of the mounting sleeves is approximately the same for a given amount of expansion of the collet regardless of the wall thickness of the mounting sleeve. In a preferred construction, the region of reduced thickness and the slot both extend axially and are diametrically opposed with the slot extending from one end of the mounting sleeve to the other end of the mounting sleeve.

With the present invention, the collet is mounted on a body section. The body section is of simple and inexpensive construction. In addition to mounting the collet, the body section is adapted to be mounted by various different devices which are typically at the disposal of a jeweler. For example, the body section may have opposed, substantially flat, external surfaces to facilitate gripping of the body section in a vise. The body section may also have a cylindrical outer surface to facilitate receipt of the body section in a bore typically found on a jeweler's bench. The cylindrical outer surface can be expanded to clamp the body section to the surfaces of the bore. In addition, the body section may include a transverse bore so that it can be attached by a screw or other fastener to a suitable supporting structure.

The body section may also have a generally axial passage therein, and the collet can be partially received within the passage. The collet can be releasably retained partly within the passage by a screw or other suitable fastener. This firmly holds the collet and simplifies collet replacement. The collet can be expanded by many different expander members, such as an expander member which includes a wedge.

The invention, together with further features and advantages thereof, can best be understood by reference to the following description taken in conjunction with the accompanying illustrative drawing.

BRIEF DESCRIPTION OF THE DRAWINGS

FIG. 1 is a side elevational view partially in section of a mandrel constructed in accordance with the teachings of this invention.

FIG. 2 is an enlarged fragmentary, longitudinal, sectional view of the mandrel.

FIG. 3 is a sectional view taken generally along line 3—3 of FIG. 1.

FIG. 4 is a sectional view taken generally along line 4—4 of FIG. 2.

DESCRIPTION OF THE PREFERRED EMBODIMENT

FIG. 1 shows a mandrel 11 which generally comprises a body section 13, a tubular member in the form of a collet 15, an expander 17 for the collet, and radially expandable means in the form of a mounting sleeve 19. The primary functions of the body section 13 are to support the collet 15 to assist in mounting the mandrel 11 on suitable mounting structure (not shown). The body section 13 can be of any construction which will permit it to carry out these functions.

In the preferred embodiment illustrated, the body section 13 includes a forward portion 21 and a rearward portion 23 integrally joined to, and coaxial with, the forward portion. The forward portion 21 has an axial bore 25 and a counterbore 27 which cooperate to define an annular shoulder 29. The mandrel 11 also has an axial counterbore 31 which extends completely through the rearward portion 23 and into the forward portion 21 to terminate in a shoulder 33. The bore 25 and the counterbores 27 and 31 cooperate to define an axial passage which extends completely through the body section 13.

The body section 13 facilitates mounting of the mandrel in four different ways. First, the elongated construction of the body section facilitates manual grasping of the body section. Secondly, the forward portion 21 has opposed, flat external surfaces 35 (FIGS. 1 and 3) to facilitate gripping the body section in a vise. In the embodiment illustrated, the flat surfaces 35 extend from the rearward end of the forward portion 21 part way into a forward tapered nose 37 on the forward section. A third way of mounting the mandrel 11 is provided by a transverse bore 39 which extends through the forward portion 21. This enables the mandrel 11 to be attached by a screw (not shown) to external mounting structure.

The fourth way of holding or mounting the mandrel 11 is provided by the rearward portion 23 which has a generally cylindrical outer surface 41. The cylindrical outer surface 41 is adapted to be received within a cylindrical hole (not shown) commonly found in jeweler's benches. As shown in FIGS. 1 and 3, the mandrel 11 has diametrically opposed axial slots 43 which divide the rearward portion 23 into half sections 45. The slots 43 continue by relatively short distance into the forward portion 21 to similarly divide the forward portion. In the embodiment illustrated, the slots 43 terminate in the transverse bore 39, although other constructions can be used. A screw 47 is threaded in a radial bore 49 in the forward portion 21 and is adapted to bear against an opposed surface of the forward portion 21. By turning the screw 47 tighter into the bore 49, the half sections 45 can be resiliently spread apart into tight frictional engagement with the hole defining surfaces into which the rearward portion 23 is inserted to thereby firmly mount the mandrel 11.

The body section 13 may be constructed of any strong material, such as metal or a rigid plastic. For example, the body section 13 may be constructed of aluminum or an aluminum alloy.

The collet 15 is merely exemplary of the kinds of resiliently deformable tubular members which can be used. In the embodiment illustrated, the collet 15 has internal threads 51 and 53 and an internal conical cam or wedge surface 55 between the threads 51 and 53. The collet 15 has a plurality of axial slots 57 (FIGS. 2 and 4) intermediate the opposite ends of the collet. The slots 57 divide the collet into axially extending strips 59. The collet 15 may be constructed of any resiliently deformable material, such as a suitable metal. The slots 57 enhance the radial resilience of the collet.

The expander 17 can also be of various configurations. In the embodiment illustrated, it includes an externally threaded shank 61, a conical wedge or nose 63 at one end, and a projection 65 with wrench flats at the other end. The threaded shank 61 is received by the internal threads 51. By screwing the expander 17 further into the collet 15, the nose 63 cooperates with the cam surface 55 of the collet to radially expand the collet. The collet 15 and the expander 17 may be of a commercially available type which is used for lapping bores.

The collet 15 can be simply and inexpensively coupled to the body section 13 by inserting one end of the collet into the counterbore 27 until it abuts the shoulder 29. A screw 67, having a head which bears against the shoulder 33, is provided in the bore 25 and cooperates with the internal threads 53 to retain the collet 15 within the counterbore 27 and tightly against the shoulder 29. Although changing the collet 15 should occur infrequently, collet changing can be simply accomplished by unscrewing the collet 15 from the screw 67.

The mounting sleeve 19 serves to mount a finger ring 69 or other generally tubular workpiece on the collet 15. In order to accomplish this, the mounting sleeve 19 must fit on or over the collet 15 and must be radially expandable to clamp the ring 69. Radially expandable means of various constructions may be employed for this purpose; however, the mounting sleeve 19 has certain features which provide distinct advantages.

In order that the mounting sleeve 19 can be mounted on the collet 15, the mounting sleeve has an internal surface 71 which enables the mounting sleeve to substantially circumscribe the collet 15. The surface 71 is of the same general configuration as the outer surface of the collet 15, and in the embodiment illustrated, the surface 71 is generally cylindrical. The diameter of the surface 71 is slightly greater than the diameter of the external surface of the collet 15 so that the mounting sleeve 19 slides easily over the collet.

The mounting sleeve 19 has an outer surface 73 which is adapted to be loosely received within the ring 69 in the unstressed condition of the mounting sleeve. Preferably, the outer surface 73 generally conforms to the size and configuration of the internal surface of the ring 69, and in the embodiment illustrated, the outer surface 73 is generally cylindrical. This provides a relatively wide area of contact between the mounting sleeve 19 and the ring 69 when the mounting sleeve is radially expanded to thereby reduce unit loading on the ring, and this in turn reduces the likelihood of deforming or disfiguring the ring.

To facilitate radial expansion of the mounting sleeve, it is provided with a slot 75. To provide optimum control on the radial expansion of the mounting sleeve 19, the slot 75 preferably extends axially of the mounting sleeve. The mounting sleeve 19 may be axially short, and in this event, the slot 75 preferably extends completely through the mounting sleeve from one end to the other.

In the embodiment illustrated, the mounting sleeve 19 is also provided with a groove 77 which defines a region 79 of reduced wall thickness of the mounting sleeve. The region 79 of reduced thickness performs two important functions. First, it facilitates radial expansion of the mounting sleeve. Secondly, the present invention contemplates providing a number of mounting sleeves 19, each with a different wall thickness, in order to accommodate rings 69 of different internal diameters. The region 79 of reduced thickness can be the same thickness for each of these mounting sleeves so a given amount of rotation of the expander 17 will provide substantially the same magnitude of radial expansion of each of the mounting sleeves 19, notwithstanding the different wall thicknesses thereof.

For optimum control of the radial expansion of the mounting sleeve 19, the groove 77 preferably extends axially of the mounting sleeve and is diametrically opposite the slot 75. Although the groove 77 could stop short of the ends of the mounting sleeve 19, in the embodiment illustrated, it extends completely through the mounting sleeve and terminates at the opposite ends of the mounting sleeve. Also, in the embodiment illustrated, the groove 77 is formed in the internal surface 71, although this is not necessary.

The mounting sleeve 19 should be constructed of a resilient, deformable material. Preferably, the material is relatively soft so as to reduce the likelihood that the mounting sleeve will disfigure or locally deform the inner surface of the ring 69. Preferably the mounting sleeve 19 is constructed of aluminum or an aluminum alloy.

In use of the mandrel 11, the body 13 is suitably mounted using one of the above-described methods. A mounting sleeve 19 of suitable external diameter for the finger ring 69 is selected. The mounting sleeve 19 is slid over the collet 15, as shown in FIGS. 1 and 2, and the ring 69 is slid over the mounting sleeve. The workman then rotates the expander 17 to advance the nose 63 into the cam surface 55 to radially expand the collet 15. As the collet 15 radially expands, it tightly engages the inner surface 71 of the mounting sleeve 19 and causes the mounting sleeve to radially expand primarily due to resilient deformation of the region 79 of reduced thickness and consequent circumferential enlargement of the slot 75. Expansion of the mounting sleeve 19 in this fashion is continued until the ring 69 is engaged with sufficient force to hold the ring in position during the work operations which the workman wishes to perform on it. The application of the clamping force to the ring 69 can be carefully controlled to prevent deforming the ring.

The relatively soft material of the mounting sleeve 19 protects the ring 69 against damage and the large area of contact between the mounting sleeve 19 and the ring 50 reduce the unit loading on the ring while holding the ring firmly. When the workman is finished with the ring 69, the expander 17 is counter rotated to permit removal of the mounting sleeve 19 and the ring 69. In order to work on a ring of a different internal diameter, it is only necessary to select a different mounting sleeve 19 suitable for the new ring. The mounting sleeves can be quickly and easily changed and there is no need to remove fasteners or other devices in order to change mounting sleeves. Of course, the use of the mandrel 11 is not limited to finger rings, and the mandrel can be used to mount other generally tubular articles.

Although an exemplary embodiment of the invention has been shown and described, many changes, modifications and substitutions may be made by one having ordinary skill in the art without necessarily departing from the spirit and scope of this invention.

I claim:

1. A mandrel for holding a generally tubular workpiece comprising:
   an elongated body section having a generally axial passage therein, said passage including a bore and a counterbore defining a shoulder therebetween;
   a tubular collet having first and second end portions, said collet being resiliently deformable radially outwardly, said first end portion of said collet being received in said passage of said body section;
   a screw in said body and received within said first end portion of said collet to retain said collet against said shoulder;
   an expander member received within the tubular collet with at least a portion of the expander being exposed adjacent said second end portion of said collet and with the expander being rotatable relative to the collet, said expander member and said second end portion of said collet having cooperating screw threads thereon whereby the expander member is threadedly attached to said collet;
   cooperating wedge surface means on said collet and said expander responsive to the rotation of the expander relative to the collet to radially expand the collet with such radial expansion being usable to firmly mount the workpiece;
   said body section including first and second axially arranged portions, said first portion of said body section having opposed substantially flat external surfaces to facilitate gripping the body section in a vise and the second portion of the body section having a generally cylindrical outer surface;
   means for radially expanding said second portion of said body section; and
   an expandable mounting sleeve positioned on and at least substantially circumscribing said collet.

2. A mandrel as defined in claim 1 wherein said collet has an exterior surface and said mounting sleeve has an interior surface, said interior surface and said exterior surface are generally cylindrical, and the interior surface of the mounting sleeve substantially circumscribes the exterior surface of the collet.

3. A mandrel for holding a generally tubular workpiece comprising:
   a body section;
   a tubular member coupled to said body section, said tubular member being resiliently deformable in a radial direction;
   means at least partially receivable within the tubular member for resiliently deforming the tubular member radially outwardly;
   radially expandable means adapted to substantially circumscribe the tubular member, said radially expandable means having a peripheral surface on which the workpiece can be positioned whereby operation of the deforming means resiliently deforms the tubular member radially outwardly with such deformation of the tubular member radially expanding the expandable means to clamp the workpiece on the peripheral surface of the radially expandable means; and
   said body section including first and second axially arranged portions, said first portion having opposed substantially flat external surfaces to facilitate gripping the body section in a vise and the second portion having a generally cylindrical outer surface, said second portion being radially expandable and including means for radially expanding the second portion, and said body section also including a transverse bore extending completely through the body section.

4. A mandrel as defined in claim 3 wherein the expandable means includes a mounting sleeve having at least one slot therein to facilitate radial expansion of the mounting sleeve.

5. A mandrel as defined in claim 4, wherein said mounting sleeve has a region of reduced thickness to facilitate radial expansion thereof.

6. A mandrel as defined in claim 5 wherein said slot and said region of reduced thickness extend generally axially of the mounting sleeve and are generally diametrically opposite, said slot having first and second opposite ends, said slot extending from one end of the mounting sleeve to the other end of the mounting sleeve.

7. A mandrel as defined in claim 3 wherein said expandable means includes an expandable sleeve constructed essentially of a material selected from the group consisting of aluminum and aluminum alloys.

8. A mandrel as defined in claim 3 wherein said body section has a generally axial passage therein, said tubular member includes a collet partially received in said passage, and said mandrel includes means for retaining the collet partly within said passage.

9. A mandrel as defined in claim 8 wherein said deforming means includes a wedge receivable within said collet.

10. A mandrel as defined in claim 8 wherein said passage includes a bore and a counterbore defining a shoulder therebetween, said collet being seated against said shoulder, and said retaining means includes a screw for releasably holding the collet against said shoulder.

11. A mandrel as defined in claim 3 wherein the expandable means includes a radially expandable mounting sleeve constructed of metal and having a passage therein, said passage being sized to slidably receive the tubular member when said tubular member is not resiliently deformed radially outwardly, said body section having a generally axial passage therein, said tubular member including a collet partially received in said passage, and means for retaining the collet partly within said passage.

12. A mandrel as defined in claim 8 wherein said collet has an exterior surface, said radially expandable means includes a mounting sleeve having an interior surface and said interior surface is generally cylindrical and is adapted to substantially circumscribe the exterior surface of the collet.

13. A mandrel as defined in claim 12 wherein said exterior surface is substantially cylindrical.

* * * * *